(12) United States Patent
Hsiang et al.

(10) Patent No.: US 10,863,207 B2
(45) Date of Patent: Dec. 8, 2020

(54) METHOD AND APPARATUS OF ENTROPY CODING AND CONTEXT MODELLING FOR VIDEO AND IMAGE CODING

(71) Applicant: MEDIATEK INC., Hsin-Chu (TW)

(72) Inventors: Shih-Ta Hsiang, New Taipei (TW); Jicheng An, Beijing (CN)

(73) Assignee: MEDIATEK INC., Hsin-Chu (TW)

( * ) Notice: Subject to any disclaimer, the term of this patent is extended or adjusted under 35 U.S.C. 154(b) by 39 days.

(21) Appl. No.: 15/777,432

(22) PCT Filed: Nov. 25, 2016

(86) PCT No.: PCT/CN2016/107241
§ 371 (c)(1),
(2) Date: May 18, 2018

(87) PCT Pub. No.: WO2017/088810
PCT Pub. Date: Jun. 1, 2017

(65) Prior Publication Data
US 2018/0332288 A1     Nov. 15, 2018

Related U.S. Application Data

(60) Provisional application No. 62/387,291, filed on Dec. 23, 2015.

(30) Foreign Application Priority Data

Nov. 27, 2015   (WO) ................ PCT/CN2015/095775

(51) Int. Cl.
*H04N 19/96*     (2014.01)
*H04N 19/91*     (2014.01)
*H04N 19/70*     (2014.01)

(52) U.S. Cl.
CPC ............ *H04N 19/91* (2014.11); *H04N 19/70* (2014.11); *H04N 19/96* (2014.11)

(58) Field of Classification Search
CPC ..... H04N 19/91; H04N 19/105; H04N 19/159
(Continued)

(56) References Cited

U.S. PATENT DOCUMENTS

| | | | |
|---|---|---|---|
| 9,578,331 | B2 | 2/2017 | Ye et al. |
| 9,596,474 | B2 | 3/2017 | Lee et al. |

(Continued)

FOREIGN PATENT DOCUMENTS

| | | | |
|---|---|---|---|
| CN | 101682770 | A | 3/2010 |
| CN | 103299627 | A | 9/2013 |

(Continued)

OTHER PUBLICATIONS

International Search Report dated Feb. 9, 2017, issued in application No. PCT/CN2016/107241.
(Continued)

*Primary Examiner* — Amir Shahnami
(74) *Attorney, Agent, or Firm* — McClure, Qualey & Rodack, LLP

(57) ABSTRACT

A method and apparatus for applying entropy coding to a symbol associated with a block are disclosed. According to the present invention, context-based entropy coding is applied to source symbols associated with blocks having variable block sizes generated by partitioning an initial block using a quadtree structure, a binary-tree structure or a combined quadtree plus binary-tree structure. Contexts according to the present invention are based on some information derived from neighbouring blocks and also based on at least one of the shape, the size and the depth of the current block since the statistics of the symbols associated with the current block may be correlated with how the
(Continued)

current block has been partitioned through a tree structure. A current symbol to be encoded or decoded may correspond to split flags and modes associated with the tree structure, skip flag or prediction mode flag.

6 Claims, 4 Drawing Sheets

(58) Field of Classification Search
USPC .......................................................... 375/240
See application file for complete search history.

(56) References Cited

U.S. PATENT DOCUMENTS

| | | | |
|---|---|---|---|
| 9,635,361 B2 | 4/2017 | Sasai et al. | |
| 9,654,785 B2 | 5/2017 | Chien et al. | |
| 9,743,085 B2 | 8/2017 | Song et al. | |
| 2012/0170648 A1* | 7/2012 | Chen | H04N 19/70 375/240.03 |
| 2012/0314766 A1 | 12/2012 | Chien et al. | |
| 2014/0219335 A1* | 8/2014 | Lee | H04N 19/18 375/240.02 |
| 2014/0369426 A1* | 12/2014 | Li | H04N 19/30 375/240.29 |

FOREIGN PATENT DOCUMENTS

| | | |
|---|---|---|
| CN | 103535036 A | 1/2014 |
| CN | 103597832 A | 2/2014 |
| CN | 104837016 A | 8/2015 |
| CN | 104994384 A | 10/2015 |
| EP | 2 725 792 A1 | 4/2014 |
| GB | 2505408 A | 3/2014 |
| WO | 2011/128269 A1 | 10/2011 |
| WO | 2014/028125 A1 | 2/2014 |
| WO | 2014/052567 A1 | 4/2014 |
| WO | 2015/131388 A1 | 9/2015 |

OTHER PUBLICATIONS

Lee, T., et al.; "CE1 subject A: Line buffer removal for CU split flag context model;" Joint Collaborative Team on Video coding (JCT-VC) of ITU-T SG 16 WP3 and ISO/IEC JTC1/SC29/WG11; Nov. 2011; pp. 1-2.
"Block partitioning structure for next generation video coding;" Telecommunicaiton Standardization Sector; Oct. 2015; pp. 1-8.
Xiaoyin, et al., Enhanced Context Modeling for Skip and Split Flag, Published on Jan. 18, 2011, Joint Collaborative Team on Video Coding (JCT-VC) of ITU-T SG16 WP3 and ISO/IEC JTC1/SC29/WG11, pp. 1-4.
Chinese language office action dated May 7, 2020, issued in application No. CN 201680068748.2.

* cited by examiner

M/2xM
Symmetric vertical splitting

M/2xM
Symmetric horizontal splitting

M/4xM (L)

M/4xM (R)

MxM/4 (U)

MxM/4 (D)

METHOD AND APPARATUS OF ENTROPY CODING AND CONTEXT MODELLING FOR VIDEO AND IMAGE CODING

CROSS REFERENCE TO RELATED APPLICATIONS

The present invention claims priority to PCT Patent Application, Serial No. PCT/CN2015/095775, filed on Nov. 27, 2015 and U.S. Provisional Patent Application, Ser. No. 62/387,291, filed on Dec. 23, 2015. The PCT Patent Application and the U.S. Provisional Patent Application are hereby incorporated by reference in their entireties.

TECHNICAL FIELD

The invention relates generally to image and video processing. In particular, the present invention relates to entropy coding and context modelling for syntax or symbols generated in video and image coding systems.

BACKGROUND

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU or can be split into four smaller units of equal sizes (i.e., M/2×M/2), which are nodes of coding tree. If units are leaf nodes of coding tree, the units become CUs. Otherwise, the quadtree splitting process can be iterated until the size for a node reaches a minimum allowed CU size as specified in the SPS. This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

One or more prediction units (PU) are specified for each CU. Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2. Unlike the CU, the PU may only be split once. The partitions shown in the second row correspond to asymmetric partitions, where the two partitioned parts have different sizes.

After obtaining the residual block by applying the prediction process based on the PU splitting type, a CU can be partitioned into transform units (TUs) according to another quadtree structure, which is analogous to the coding tree for the CU. In FIG. 1, the solid lines in block 110 indicate CU boundaries, and dotted lines in block 110 indicate TU boundaries. Similarly, the solid lines for the partition tree structure 120 corresponds to the CU partition tree structure and the dashed lines for the partition tree structure 120 corresponds to the TU partition tree structure. The TU is a basic representative block of residual or transform coefficients for applying the integer transform and quantization. For each TU, one integer transform with the same size is applied to the TU to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure can be used as disclosed in ITU-T SG 16 (Study Period 2013), Contribution 966 (J. An, et al, "Block partitioning structure for next generation video coding", ITU-T T13 SG16 COM 16-C 966 R3-E, Geneva, September 2015). In the disclosed binary tree partitioning structure, a block can be recursively split into two smaller blocks. There are several splitting types as shown in FIG. 3. The most efficient and simplest ones are the symmetric horizontal and vertical splits as shown in the top two splitting types in FIG. 3. Therefore, a system may choose to only use these two splitting types. For a given block of size M×N, a flag can be signalled to indicate whether to split a block into two smaller blocks. If the flag indicates "yes", another syntax element is signalled to indicate which splitting type is used (i.e., horizontal or vertical). If the horizontal splitting is used then it is split into two blocks of size M×N/2, otherwise if the vertical splitting is used then it is split into two blocks of size M/2×N. The binary tree splitting process can be iterated until the size (width or height) for a splitting block reaches a minimum allowed block size (width or height) that can be defined in high level syntax such as SPS (sequence parameter set). Since the binary tree has two splitting types (i.e., horizontal and vertical), the minimum allowed block width and height should be both indicated. Non-horizontal splitting is implicit when the splitting would result in a block height smaller than the indicated minimum. Non-vertical splitting is implicit when splitting would result in a block width smaller than the indicated minimum. FIG. 4 illustrates an example of block partitioning 410 and its corresponding binary tree structure 420. In each splitting (i.e., non-leaf) node of the binary tree, one flag indicates which splitting type (horizontal or vertical) is used, 0 indicates horizontal splitting and 1 indicates vertical splitting.

The proposed binary tree structure can be used for partitioning a block into multiple smaller blocks such as partitioning a slice into CTUs, a CTU into CUs, a CU into PUs, or a CU into TUs, and so on. In one embodiment, the binary tree is used for partitioning a CTU into CUs. In other words, the root node of the binary tree is a CTU and the leaf nodes of the binary tree are CUs. The leaf nodes are further processed by prediction and transform coding. In another embodiment, there is no further partitioning from CU to PU or from CU to TU to simplify the block partitioning process. That means the CU is equal to the PU and also equal to TU. Therefore, the leaf nodes of the binary tree are also the basic unit for prediction and transform coding in this case.

Binary tree structure is more flexible than quadtree structure, since much more partition shapes can be supported, which is also a factor for coding efficiency improvement. However, the encoding complexity will also increase in order to select the best partition shape. In order to balance the complexity and coding efficiency, a method to combine the quadtree and binary tree structure is disclosed in PCT/CN2015/096761, filed on Dec. 9, 2015, which is called quadtree plus binary tree (QTBT) structure. In the disclosed QTBT structure, a block is firstly partitioned by a quadtree structure, the quadtree splitting can be iterated until the size for a splitting block reaches the minimum allowed quadtree leaf node size. If the leaf quadtree block is not larger than the maximum allowed binary tree root node size, it can be further partitioned by a binary tree structure, the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT structure 520. The solid lines indicate quadtree splitting and dotted lines indicate binary tree splitting. In each splitting (i.e., non-leaf) node of the binary tree, one flag indicates which splitting type (horizontal or vertical) is used, 0 indicates horizontal splitting and 1 indicates vertical splitting.

The disclosed QTBT structure can be used for partitioning a block into multiple smaller blocks such as partitioning a slice into CTUs, a CTU into CUs, a CU into PUs, or a CU into TUs, and so on. For example, the QTBT can be used for partitioning a CTU into CUs, i.e., the root node of the QTBT is a CTU, which is partitioned into multiple CUs by a QTBT structure. The CUs are further processed by prediction and transform coding. Simplification of the QTBT structure has been also disclosed in PCT/CN2015/096761, filed on Dec. 9, 2015, where no further partitioning is applied from CU to PU or from CU to TU. In other words, a CU is equal to a PU and is also equal to a TU. Therefore, the leaf node of the QTBT structure is the basic unit for prediction as well as for transform.

An example of the disclosed QTBT structure is shown as follows. The QTBT structure may be applied to a CTU with size 128×128, the minimum allowed quadtree leaf node size is equal to 16×16, the maximum allowed binary tree root node size is equal to 64×64, the minimum allowed binary tree leaf node width and height both are equal to 4, and the maximum allowed binary tree depth is equal to 4. Firstly, the CTU is partitioned by a quadtree structure and the leaf quadtree unit may have a size from 16×16 (minimum allowed quadtree leaf node size) to 128×128 (equal to CTU size, i.e., no split). If the leaf quadtree unit is 128×128, it cannot be further split by the binary tree since the size exceeds the maximum allowed binary tree root node size 64×64. Otherwise the leaf quadtree unit can be further split by binary tree. The leaf quadtree unit is used as the root binary tree unit that has binary tree depth of 0. When the binary tree depth reaches 4 (i.e., the indicated maximum binary tree depth), non-splitting is implicit. When the binary tree node has width equal to 4, non-horizontal splitting is implicit. When the binary tree node has height equal to 4, non-vertical splitting is implicit. The leaf nodes of the QTBT are further processed by prediction (e.g., Intra picture or Inter picture) and transform coding.

The disclosed tree structure can be applied separately to luma and chroma for the I-slice (i.e., Intra coded slice) and applied simultaneously to both luma and chroma (except when certain minimum sizes are reached for chroma) for the P- and B-slice. In other words, in the I-slice, the luma CTB has its QTBT-structured block partitioning, and the two chroma CTBs have another QTBT-structured block partitioning. The two chroma CTBs may also have their own QTBT-structured block partitioning.

SUMMARY

A method and apparatus for applying entropy coding to a symbol associated with a block for video encoding or decoding performed by a video encoder or a video decoder respectively are disclosed. In one embodiment, input data associated with a current block in a current picture are received, where the current block is generated by applying block partitioning to an initial block using a quadtree structure, binary-tree structure or quadtree plus binary-tree structure. A current symbol to be encoded or decoded from the input data is determined, where the current symbol is associated with the current block. A current context is determined based on first information derived from one or more neighbouring blocks and second information related to at least a block shape or a partition depth of the current block, where the neighbouring blocks are processed prior to the current block. Context-based entropy encoding or decoding is applied to the current symbol according to the current context.

In one embodiment, the current symbol corresponds to a quadtree split flag and the current context is determined according to both a current quadtree depth of the current block and a number of neighbouring blocks having a greater quadtree depth than the current block, and wherein the current block is generated by partitioning the initial block using the quadtree structure, and the neighbouring blocks consists of a top neighbouring block and a left neighbouring block. For example, the current quadtree depth can be divided into three classes representing the current quadtree depth equal to 0, equal to 1 or greater than 1 respectively; the number of neighbouring blocks having the greater quadtree depth than the current block has a value corresponding to 0, 1 or 2; and a total of 5 contexts are used based on the three classes and three values of the number of neighbouring blocks having a greater quadtree depth than the current block. When the current context is determined based on the partition depth of the current block, the current context may be further determined based on the block size of the current block if different block sizes of the initial block are used. Different contexts may be used for different quadtree depths of the current block and for different values of the number of neighbouring blocks having a greater quadtree depth than the current block. Also, different contexts can be used for different current quadtree depths when both the quadtree split flags of the top neighbouring block and the left neighbouring block are equal to 1.

In another embodiment, the current symbol corresponds to a Skip flag and the current context is determined according to both a current binary-tree depth of the current block and a number of neighbouring blocks coded in a Skip mode, where the current block is generated by partitioning the initial block using the binary-tree structure, and the neighbouring blocks consists of a top neighbouring block and a left neighbouring block. When a given block is coded in the Skip mode, no more syntax elements are signalled except for a merging candidate index for the given block. The current binary-tree depth can be divided into three classes representing the current binary-tree depth equal to 0, equal to 1 or 2, and greater than 2 respectively. The number of neighbouring blocks coded in the Skip mode has a value corresponding to 0, 1 or 2. In this case, a total of 9 contexts can be used based on the three classes and three values of the number of neighbouring blocks coded in the Skip mode.

In yet another embodiment, the current symbol corresponds to a prediction mode flag for indicating whether the current block is coded in Inter prediction mode or Intra prediction mode, and the current context is determined according to both a current combined quadtree and binary-tree depth associated with the current block and a number of neighbouring blocks coded in an Intra mode, where the current block is generated by partitioning the initial block using a combined quadtree and binary-tree structure. The neighbouring blocks consists of a top neighbouring block and a left neighbouring block. The current combined quadtree and binary-tree depth is calculated as a sum of quadtree depth of the current block scaled by 2 and binary-tree depth of the current block. For example, two contexts are used for the number of neighbouring blocks coded in an Intra mode equal to 1 and 2 respectively, and two additional contexts are used for the current combined quadtree and binary-tree depth being smaller than 4 and being not smaller than 4 respectively when the number of neighbouring blocks coded in an Intra mode equal to 0. Different contexts can be used based on the result of comparing the current combined quadtree and binary-tree depth with a depth threshold. In this case, the depth threshold may be dependent on the block size of the current block if different block sizes of the initial block are used.

In still yet another embodiment, the current symbol corresponds to a first bin associated with a binary-tree split flag for indicating whether the current block is split and the current context is determined according to a number of neighbouring blocks having a greater combined quadtree and binary-tree depth than the current block. The current block is generated by partitioning the initial block using a combined quadtree and binary-tree structure. The current combined quadtree and binary-tree depth for a given block is calculated as a sum of quadtree depth of the given block scaled by 2 and binary-tree depth of the given block. The neighbouring blocks consists of a top neighbouring block and a left neighbouring block. Furthermore, a current second symbol corresponds to a second bin associated with the binary-tree split flag for indicating horizontal split or vertical split and a current second context is determined for the second bin according to a block shape of the current block. Three second contexts can be used, where the three second contexts correspond to the block shape of the current block being a square, a rectangle with width larger than height, and a rectangle with width smaller than height respectively. Different sets of contexts can be used for three different shapes of the current block, where the three different shapes of the current block correspond to a square, a rectangle with width larger than height, and a rectangle with width smaller than height respectively. Different sets of contexts or different sets of second contexts can be used for different combined quadtree and binary-tree depths of the current block. Also, different sets of contexts or different sets of second contexts can be used for at least two different binary-tree depths of the current block. For example, 4 different sets of contexts and 4 different sets of second contexts can be used for 4 different binary-tree depth types corresponding to the binary-tree depth equal to 0, equal to 1, equal to 2, and greater than 2 respectively. In another example, different sets of contexts or different sets of second contexts can be used for at least two different quadtree depths of the current block or at least two different binary-tree depths of the current block.

DETAILED DESCRIPTION

Figure 1:
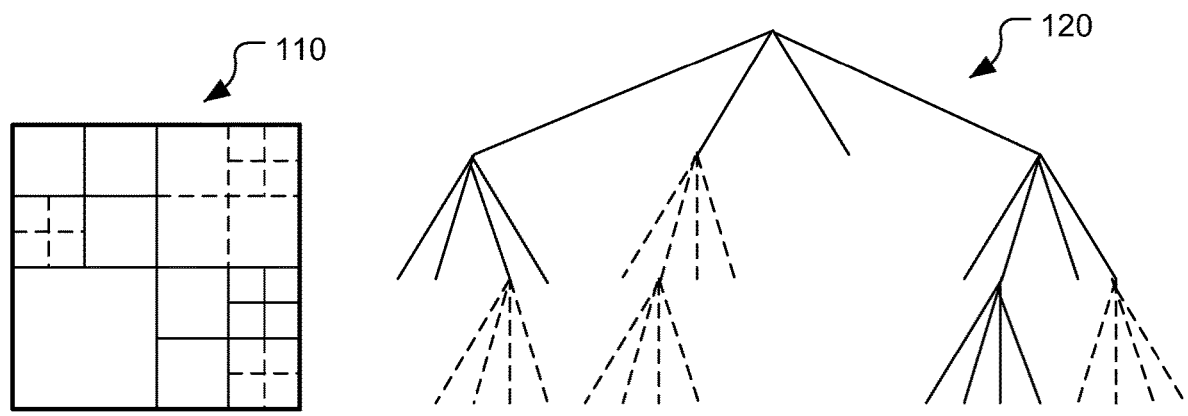
FIG. 1 illustrates the subdivision of a CTU into CUs and TUs using a corresponding quadtree in HEVC (high efficiency video coding).
Figure 2:
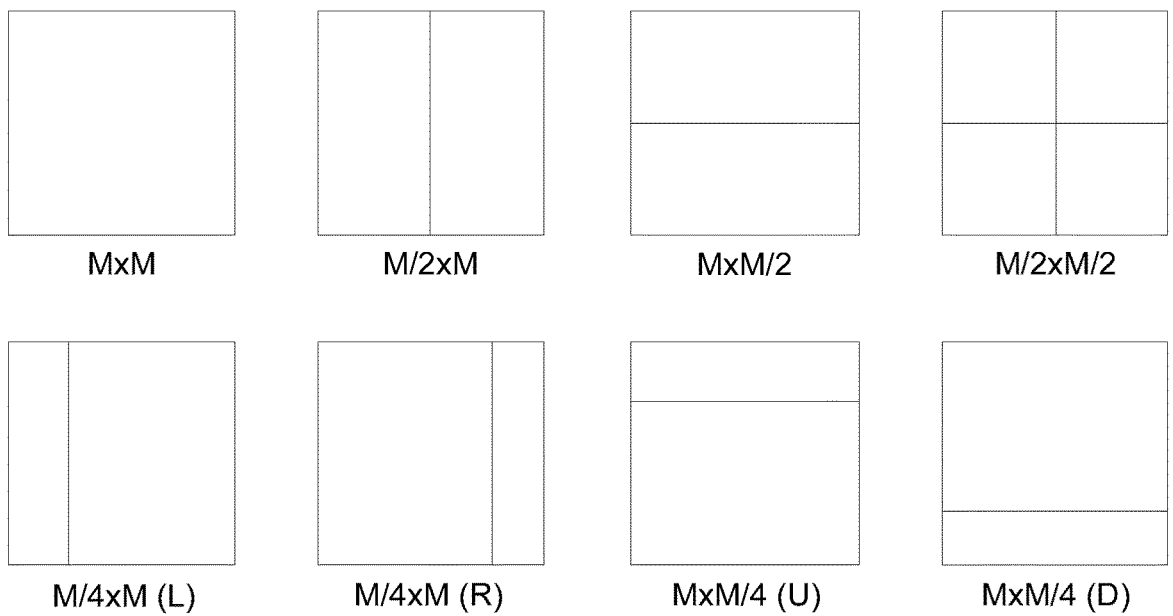
FIG. 2 illustrates the eight partition types for splitting a CU (coding unit) into one or more PUs (prediction units) in HEVC (high efficiency video coding).
Figure 3:
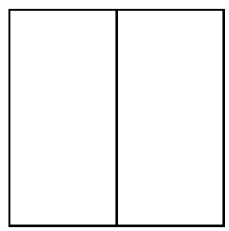
FIG. 3 illustrates the possible splitting types for a binary tree.
Figure 3:
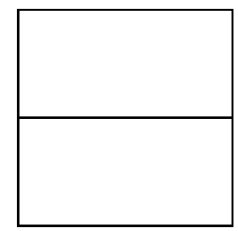
Figure 3:
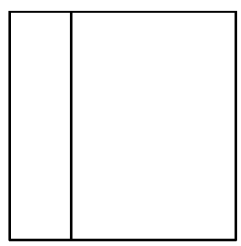
Figure 3:
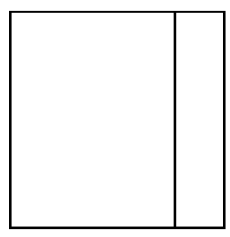
Figure 3:
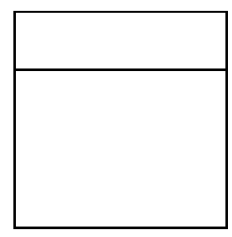
Figure 3:
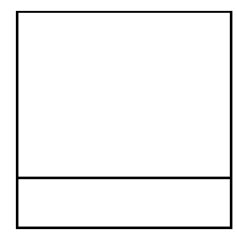
Figure 4:
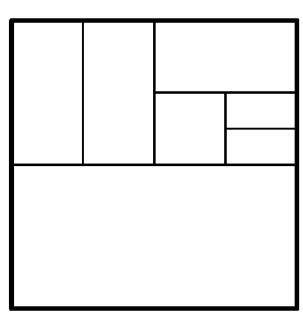
FIG. 4 illustrates an example of block partition using a corresponding binary tree.
Figure 4:
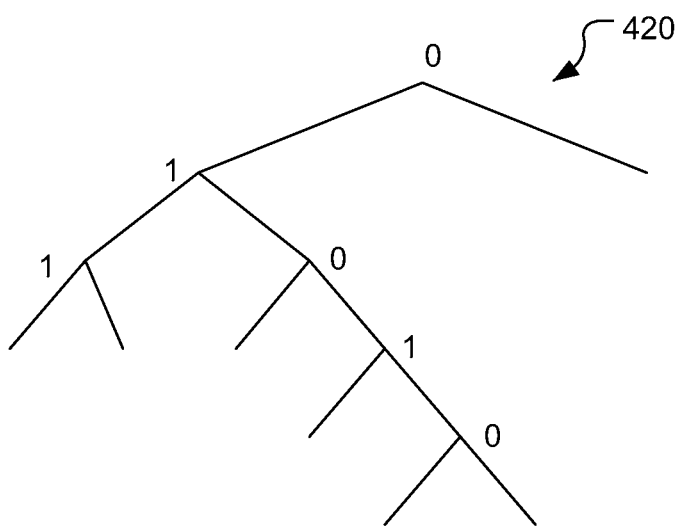
Figure 5:
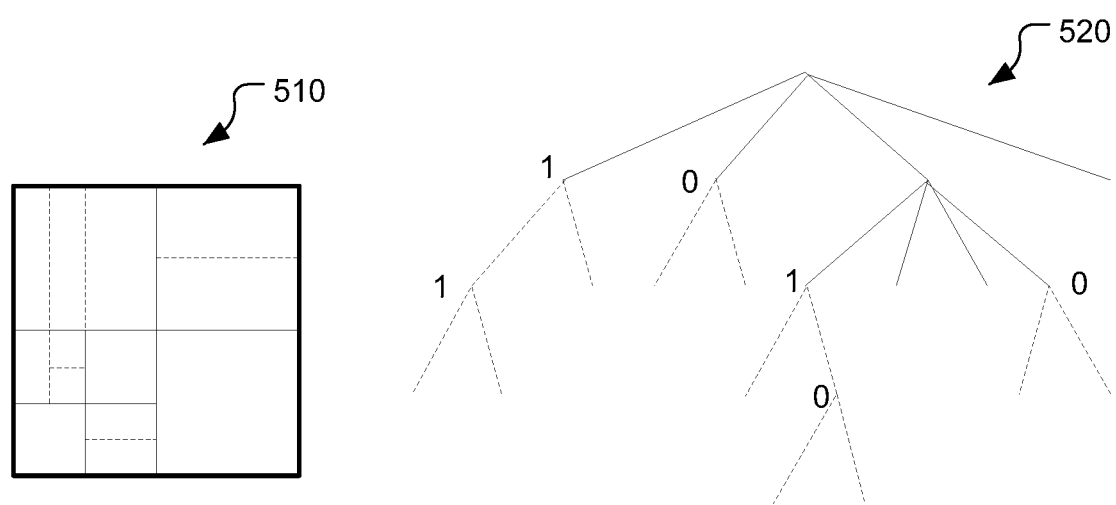
FIG. 5 illustrates an example of block partition using a corresponding quadtree plus binary tree (QTBT).

The following description is of the best-contemplated mode of carrying out the invention. This description is made for the purpose of illustrating the general principles of the invention and should not be taken in a limiting sense. The scope of the invention is best determined by reference to the appended claims.

In order to improve coding efficiency, entropy coded using the context-based adaptive binary arithmetic coding (CABAC) mode is applied to the representation of the binary tree structure in the present invention. According to the present invention, context-based entropy coding is applied to source symbols associated with blocks having variable block sizes generated by partitioning an initial block using a quadtree structure, a binary-tree structure or a combined quadtree plus binary-tree structure. Contexts according to the present invention are based on some information derived from neighbouring blocks and also based on at least one of the shape, the size and the depth of the current block since the statistics of the symbols associated with the current block may be correlated with how the current block has been partitioned through a tree structure.

In one method, the context modelling takes into account of the information related to the binary tree depth of the neighbouring blocks and the binary tree depth of the current block, where the split decision may be signalled for the current block. The contextual information can further take into account of the size and/or the shape of the current block. When combined with the quadtree structure, the context modelling may further exploit the information related to the quadtree depths of the neighbouring blocks and the quadtree depth of the current block. A binary syntax element bt_split_flag can be coded to signal whether the current block is further split or not. If the syntax element bt_split_flag is true (i.e., splitting), a syntax element bt_split_mode can be coded to indicate the split or partitioning mode (i.e., horizontal or vertical) used by the current block.

In one embodiment for the QTBT structure with the two binary split modes, context modelling for entropy coding the syntax element bt_split_flag is conditioned on the number of the neighbouring blocks that have a greater combined QTBT depth than the current block. For example, the neighbouring blocks consist of the top block and the left block of the current block. The combined QTBT depth of a block is defined as the sum of its quadtree depth scaled by 2 and its binary tree depth. Context modelling for entropy coding the syntax element bt_split_mode can be further conditioned on the shape of the current block. Table 1 and Table 2 below illustrate exemplary mapping tables for context selection for coding syntax elements bt_split_flag and bt_split_mode respectively according to an embodiment of the present invention. In Table 1, ctxInc equal to 0 corresponds to none of the top block and the left block has a greater combined QTBT depth than the current block; ctxInc equal to 1 corresponds to only one of the top block and the left block has a greater combined QTBT depth than the current block; and ctxInc equal to 2 corresponds to both the top block and the left block have a greater combined QTBT depth than the current block. In Table 2, the context as identified by context index, ctxInc is based on the shape of the current block. In particular, ctxInc equal to 0 corresponds to a square block; ctxInc equal to 1 corresponds to a rectangular block having the width larger than the height; and ctxInc equal to 2 corresponds to a rectangular block having the height larger than the width. It is understood that the examples in Table 1 and Table 2 are intended for illustration purpose and shall not be construed as limitations to the present invention. Other numbers of contexts may be used according to the present invention. For example, the two rectangle shapes in Table 2 may share the same context to reduce the total number of contexts from 3 to 2. Accordingly, the tables in the following disclosures are meant for illustration and shall not be construed as limitations to the present invention.

TABLE 1

| ctxInc | 0 | 1 | 2 |
|---|---|---|---|
| # of neighbouring CUs with greater combined QTBT depth | 0 | 1 | 2 |

TABLE 2

| ctxInc | 0 | 1 | 2 |
|---|---|---|---|
| block shape | square | width > height | width < height |

In another embodiment, the context modelling is further conditioned on the binary tree depth of the current block. Table 3 and Table 4 illustrate exemplary mapping tables for context selection for coding syntax elements bt_split_flag and bt_split_mode respectively according to an embodiment of the present invention, where "W" and "H" denotes the width and height of the current block. In another embodiment, context modelling is further conditioned on the quadtree depth of the current block. In another embodiment, context modelling is conditioned on the quadtree depth and/or binary tree depth of the current block and the different quadtree depths or binary tree depths can share the same set of modelling contexts. As shown in Table 3, a total of 12 contexts (i.e., ctxInc from 0 to 11) are used. As shown in Table 4, a total of 8 contexts (i.e., ctxInc from 0 to 7) are used. Again, it is understood that the examples in Table 3 and Table 4 are intended for illustration purpose and shall not be construed as limitations to the present invention. More or fewer numbers of contexts or different context mapping may be used according to the present invention. For example, the contexts for binary-tree depths 1 and 2 associated with block shape being "W<H" are different in Table 4. However, these two conditions may share a same context according to another example.

TABLE 3

| binary tree depth | | 0 | | | 1 | |
|---|---|---|---|---|---|---|
| ctxInc | 0 | 1 | 2 | 3 | 4 | 5 |
| # of neighbouring CUs with greater combined QTBT depth | 0 | 1 | 2 | 0 | 1 | 2 |
| binary tree depth | | 2 | | | >2 | |
| ctxInc | 6 | 7 | 8 | 9 | 10 | 11 |
| # of neighbouring CUs with greater combined QTBT depth | 0 | 1 | 2 | 0 | 1 | 2 |

TABLE 4

| binary tree depth | | 0 | | | 1 | |
|---|---|---|---|---|---|---|
| ctxInc | | 0 | | | 2 | 5 |
| block shape | | square | | | W > H | W < H |
| binary tree depth | | 2 | | | >2 | |
| ctxInc | 1 | 3 | 6 | 1 | 4 | 7 |
| block shape | square | W > H | W < H | square | W > H | W < H |

In yet another embodiment, different context sets can be used for coding syntax element bt_split_flag according to the shape of the current block. For example, separate sets of contexts for different shapes of the current block can be derived based on:

$$ctx\mathrel{+}=(W\mathord{=}\mathord{=}H?0\mathord{:}(W>H?1\mathord{:}2))*num\_ctx\_set. \quad (1)$$

When the method of separate sets of contexts is applied to the case in Table 1, the 3 contexts in Table 1 may become 9 contexts for 3 different block shapes.

In still yet another embodiment, the context can be conditioned on the combined quadtree plus binary-tree depth of the current block. For example, separate sets of contexts for different combined quadtree plus binary-tree depths of the current block can be derived based on:

$$ctx\mathrel{+}=((QT\text{depth}\mathord{<}\mathord{<}1)+BT\text{depth})*num\_ctx\_set. \quad (2)$$

In eq. (2), the term ((QTdepth<<1)+BTdepth) corresponds to combined quadtree plus binary-tree depth, where QTdepth is the quadtree depth of the current block and BTdepth is the binary-tree depth of the current block.

It is well known that the statistical characteristics of the source syntax element values from a block are often highly correlated to the corresponding syntax element values from its neighbouring blocks due to strong spatial dependency often existing in a video source. It is further observed from our experimental results that the statistical characteristics of the source syntax element values from a block are often related to the block size or the depth of the partitioning tree associated with the current block. Therefore, the context modelling scheme for entropy coding a syntax element from the blocks of varying size is conditioned on some related information from the neighbouring blocks according to one embodiment of the present invention. The context modelling is further conditioned on the block size or the depth of the partitioning tree associated with the current block. In order to reduce the modelling cost, some close or related contextual conditions can share a modelling context. For example, the same set of contexts for the adjacent tree depths of the current block can be assigned to the current block according to one embodiment. When the block partitioning is performed separately for different colour components, the context modelling scheme can be further conditioned on the colour component index of the current block according to another embodiment of the present invention.

In one embodiment, the proposed context modelling scheme is utilized for entropy coding the binary value of the CU quad-tree split flag (e.g. the syntax element split_cu_flag in HEVC) resulting from a quadtree or QTBT partitioning structure. The proposed context modelling scheme can be conditioned on the number of the neighbouring CUs having a greater quadtree depth than the current CU and is further conditioned on the quadtree depth of the current CU for certain neighbouring configurations. For example, the context index ctxInc for the current CU can be determined according to:

$$ctxInc=(d<T0?0:(d>T1?(T1-T0+1):(d-T0)))*(N+1)+n. \quad (3)$$

In eq. (3), n is the number of the neighbouring CUs having a greater QT depth than the current CU, N is the maximum number of the neighbouring CUs, d is the quadtree depth of the current CU, and T0 and T1 are some pre-determined depth threshold values. The logic operator "x ? y: z" means "if x is TRUE or not equal to 0, evaluates to the value of y; otherwise, evaluates to the value of z".

In another example for a reduced total number of contexts, the context index ctxInc for the current CU is determined by $$ctxInc=(n<N)?n:((d<T0?0:(d>T1?(T1-T0+1):(d-T0)))+N). \quad (4)$$

In eq. (4), n is the number of the neighbouring CUs corresponding to greater QT depth, N is the maximum number of the neighbouring CUs, d is the quadtree depth of the current CU, and T0 and T1 are some pre-determined quadtree depth threshold values. An exemplary mapping table for context selection based on eq. (4) is shown in Table 5A for the syntax element split_cu_flag, where the context modelling is further conditioned on the quadtree depth of the current CU with threshold values T0 and T1 equal to 0 and 2 respectively when both neighbouring CUs having a greater quadtree depth (i.e., N equal to 2). As shown in Table 5A, there are a total of 6 contexts (i.e., ctxInc from 0 to 5) used. Table 5B illustrates another example, where all quadtree depths of the current CU greater than 1 are grouped into a class and a total of 6 contexts (i.e., ctxInc from 0 to 4) are used.

TABLE 5A

| quadtree depth of the current CU | 0 | | | 1 | | | 2 | | | >2 | | |
|---|---|---|---|---|---|---|---|---|---|---|---|---|
| ctxInc | 0 | 1 | 2 | 0 | 1 | 3 | 0 | 1 | 4 | 0 | 1 | 5 |
| # of neighbouring CU's with greater QT depth | 0 | 1 | 2 | 0 | 1 | 2 | 0 | 1 | 2 | 0 | 1 | 2 |

TABLE 5B

| quadtree depth of the current CU | 0 | | | 1 | | | >1 | | |
|---|---|---|---|---|---|---|---|---|---|
| ctxInc | 0 | 1 | 2 | 0 | 1 | 3 | 0 | 1 | 4 |
| # of neighbouring CU's with greater QT depth | 0 | 1 | 2 | 0 | 1 | 2 | 0 | 1 | 2 |

When the CTU size is fixed, the CU size can be uniquely derived from the quadtree depth. For example, when CTU size is 128, the CU size can be equal to 128, 64, and 32 for quadtree depth equal to 0, 1, and 2 respectively. However, when different CTU sizes are used, such as CTU equal to 256, the CU size can be 256, 128, and 64 for quadtree depth equal to 0, 1, and 2 respectively. In this case, the CUs with a given size could be coded using different sets of contexts when since different CTU sizes are used. This may not be desirable. Accordingly, in another embodiment, the context modelling is further conditioned on the block size when the context is dependent on the quadtree depth. Alternatively, the quadtree depth can be adjusted with the CTU size such that the same CU size is assigned to the same set of models.

In another embodiment, the proposed context modelling method is applied for entropy coding the binary value of the CU skip flag (e.g. the syntax element cu_skip_flag in HEVC) resulting from a quadtree, binary tree, or QTBT partitioning structure. The CU skip flag equal to 1 specifies that for the current CU, no more syntax elements are signalled except the merging candidate index. For example, the proposed context modelling method is conditioned on the number of the neighbouring skipped CUs and is further conditioned on the binary tree or QTBT depth of the current CU. For example, the context index ctxInc for the current CU can be determined according to:

$$ctxInc=(((d+1)>>1)<T0?0:(((d+1)>>1)>T1?(T1-T0+1):(((d+1)>>1)-T0)))*(N+1)+n. \quad (5)$$

In eq. (5), n is the number of the skipped neighbouring CUs, N is the maximum number of the skipped neighbouring CUs, d is the BT, QT or BTQT depth of the current CU, and T0 and T1 are some pre-determined depth threshold values. Table 6 illustrates an exemplary mapping table of context selection for syntax cu_skip_flag in a binary tree or QTBT partitioning structure according to an embodiment of the present invention. In Table 6, a total of 9 contexts (i.e., ctxInc from 0 to 8) are used. Table 7 illustrates an exemplary mapping table for context selection using a quadtree partitioning structure according to an embodiment of the present invention. In Table 6, a total of 12 contexts (i.e., ctxInc from 0 to 11) are used.

TABLE 6

| BT depth | 0 | | | 1, 2 | | | | >2 | |
| --- | --- | --- | --- | --- | --- | --- | --- | --- | --- |
| ctxInc | 0 | 1 | 2 | 3 | 4 | 5 | 6 | 7 | 8 |
| # of skipped neighbouring CU's | 0 | 1 | 2 | 0 | 1 | 2 | 0 | 1 | 2 |

TABLE 7

| QT depth | 0 | | | 1, 2 | | | 3, 4 | | | >4 | | |
| --- | --- | --- | --- | --- | --- | --- | --- | --- | --- | --- | --- | --- |
| ctxInc | 0 | 1 | 2 | 3 | 4 | 5 | 6 | 7 | 8 | 9 | 10 | 11 |
| # of skipped neighbouring CUs | 0 | 1 | 2 | 0 | 1 | 2 | 0 | 1 | 2 | 0 | 1 | 2 |

In another example for reducing the total number of contexts, the context index ctxInc for the current CU is determined according to:

$$ctxInc = (n<N)?n:((((d+1)>>1)<T0?0:(((d+1)>>1)>T1?(T1-T0+1):(((d+1)>>1)-T0)))+N). \quad (6)$$

In eq. (6), n is the number of the skipped neighbouring CUs, N is the maximum number of the skipped neighbouring CUs, d is the BT, QT or BTQT depth of the current CU, and T0 and T1 are some pre-determined depth threshold values.

The present invention can be applied to syntax element pred_mode_flag. The syntax element pred_mode_flag equal to 0 specifies that the current coding unit is coded in inter prediction mode. The syntax element pred_mode_flag equal to 1 specifies that the current coding unit is coded in intra prediction mode. In the existing HEVC standard, syntax element pred_mode_flag equal is entropy coded using a single context. An embodiment of the present invention derives the context based on the number of neighbouring blocks coded in the Intra mode, where the neighbouring blocks consist of a top block and a left block. The context is further conditioned on the combined quadtree plus binary-tree depth of the current block, QBTdepth=(QTdepth*2+BTdepth+1)>>1, where QTdepth is the quadtree depth of the current block and BTdepth is the binary-tree depth of the current block. According to this embodiment, an initial context index ctxInc is derived based on the number of neighbouring blocks coded in the Intra mode. The initial ctxInc is then modified to be further conditioned on the combined quadtree plus binary-tree depth of the current block:

$$ctxInc = ctxInc?(ctxInc+1):(QBTdepth<4?0:1). \quad (7)$$

According to eq. (7), a total of 4 contexts are generated for syntax element pred_mode_flag. In the above example, the context selection depends on the result of comparing the combined quadtree plus binary-tree depth of the current block (i.e. QBTdepth) with a depth threshold, where the depth threshold is equal to 4 in eq. (7)). If different CTU sizes are used, such as CTU equal to 256 or 128, the depth threshold should take into account the quadtree depth due to different CTU sizes. For example, in eq. (7), the depth threshold for CTU size equal to 128 is 4. The depth threshold for CTU size equal to 256 should be adjusted to 6. Accordingly, in another embodiment, the depth threshold is dependent on a block size of the current CU if different CTU block sizes are used.

Figure 6:
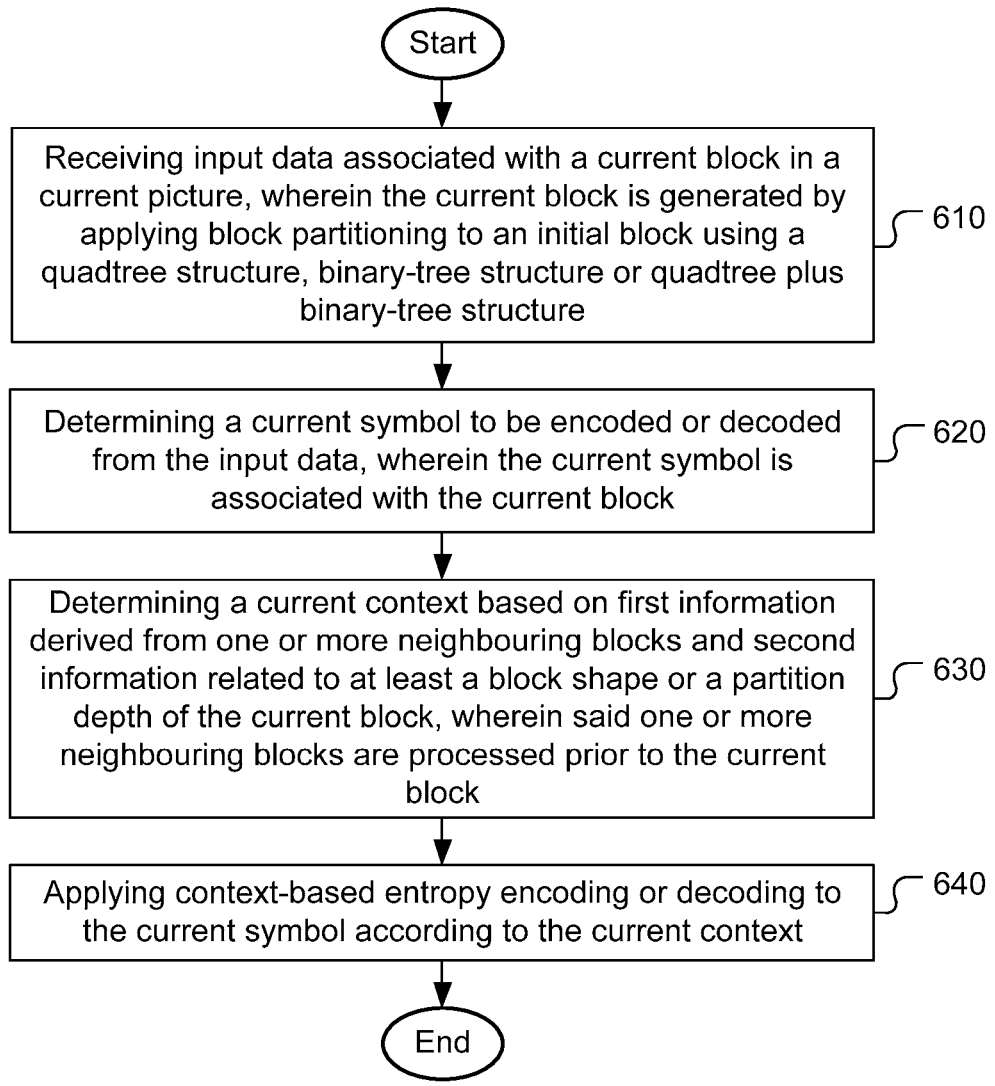
FIG. 6 illustrates a flowchart for an exemplary coding system incorporating context-based entropy coding for symbols associated with a block generated using a quadtree structure, binary-tree structure or combined quadtree plus binary-tree structure according to an embodiment of the present invention.

FIG. 6 illustrates a flowchart for an exemplary coding system incorporating context-based entropy coding for symbols associated with a block generated using a quadtree structure, binary-tree structure or combined quadtree plus binary-tree structure according to an embodiment of the present invention. According to this method, input data associated with a current block in a current picture is received in step 610, where the current block is generated by applying block partitioning to an initial block using a quadtree structure, binary-tree structure or quadtree plus binary-tree structure. In an encoder side, the input data correspond one or more symbols associated with the current block. The symbol may be related to the partition process that is used to generate the current block. The symbol may also correspond to other syntax elements associated with the current block, such as the skip flag o the prediction mode flag. In the decoder side, the input data may correspond to a video bitstream or a binary string associated with a coded symbol or syntax element to be decoded using context-based entropy decoding. A current symbol to be encoded or decoded is determined from the input data in step 620, where the current symbol is associated with the current block. A current context is determined based on first information derived from one or more neighbouring blocks and second information related to at least a block shape or a partition depth of the current block in step 630, where said one or more neighbouring blocks are processed prior to the current block. Context-based entropy encoding or decoding is then applied to the current symbol according to the current context in step 640.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of applying entropy coding to a symbol associated with a block for video encoding or decoding performed by a video encoder or a video decoder respectively, the method comprising:
   receiving input data associated with a current block in a current picture, wherein the current block is generated by applying block partitioning to an initial block comprising a quadtree structure;
   determining a current symbol to be encoded or decoded from the input data, wherein the current symbol is associated with the current block;
   determining a current context based on first information derived from one or more neighbouring blocks and second information related to at least a block shape or a partition depth of the current block, wherein said one or more neighbouring blocks are processed prior to the current block, wherein the current symbol corresponds to a quadtree split flag and the current context is determined according to both a current quadtree depth of the current block and a number of neighbouring blocks having a greater quadtree depth than the current block, wherein different contexts are used for different quadtree depths of the current block and for different values of the number of neighbouring blocks having the greater quadtree depth than the current block; and
   applying context-based entropy encoding or decoding to the current symbol according to the current context.

2. The method of claim 1, wherein the current block is generated by partitioning the initial block using the quadtree structure, and the neighbouring blocks consists of a top neighbouring block and a left neighbouring block.

3. The method of claim 2, wherein the current quadtree depth is divided into three classes representing the current quadtree depth equal to 0, equal to 1 or greater than 1 respectively; the number of neighbouring blocks having the greater quadtree depth than the current block has a value corresponding to 0, 1 or 2; and a total of 5 contexts are used based on the three classes and three values of the number of neighbouring blocks having the greater quadtree depth than the current block.

4. The method of claim 2, wherein when the current context is determined based on the partition depth of the current block, the current context is further determined based on a block size of the current block if different block sizes of the initial block are used.

5. The method of claim 2, wherein different contexts are used for different current quadtree depths when both the quadtree split flags of the top neighbouring block and the left neighbouring block are equal to 1.

6. An apparatus for applying entropy coding to a symbol associated with a block for video encoding or decoding performed by a video encoder or a video decoder respectively, the apparatus comprising one or more electronic circuits or processors configured to:
   receive input data associated with a current block in a current picture, wherein the current block is generated by applying block partitioning to an initial block comprising a quadtree structure;
   determine a current symbol to be encoded or decoded from the input data, wherein the current symbol is associated with the current block;
   determine a current context based on first information derived from one or more neighbouring blocks and second information related to at least a block shape or a partition depth of the current block, wherein said one or more neighbouring blocks are processed prior to the current block, wherein the current symbol corresponds to a quadtree split flag and the current context is determined according to both a current quadtree depth of the current block and a number of neighbouring blocks having a greater quadtree depth than the current block, wherein different contexts are used for different quadtree depths of the current block and for different values of the number of neighbouring blocks having the greater quadtree depth than the current block; and
   apply context-based entropy encoding or decoding to the current symbol according to the current context.

* * * * *